United States Patent
Woo et al.

(10) Patent No.: US 11,701,275 B2
(45) Date of Patent: Jul. 18, 2023

(54) TOWING MODULE, A PERSONAL MOBILITY INCLUDING THE SAME, AND A CONTROL METHOD FOR A PERSONAL MOBILITY

(71) Applicants: HYUNDAI MOTOR COMPANY, Seoul (KR); KIA CORPORATION, Seoul (KR)

(72) Inventors: Seunghyun Woo, Seoul (KR); Soobin Kim, Seoul (KR); Jae Yul Woo, Seoul (KR); Rowoon An, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 202 days.

(21) Appl. No.: 17/239,197

(22) Filed: Apr. 23, 2021

(65) Prior Publication Data
US 2022/0096292 A1    Mar. 31, 2022

(30) Foreign Application Priority Data

Sep. 28, 2020    (KR) .................. 10-2020-0125835

(51) Int. Cl.
*A61G 5/04*    (2013.01)
*A61G 5/10*    (2006.01)

(52) U.S. Cl.
CPC ........... *A61G 5/047* (2013.01); *A61G 5/1051* (2016.11); *A61G 2203/10* (2013.01)

(58) Field of Classification Search
CPC .. A61G 5/047; A61G 5/1051; A61G 2203/10; B60K 2001/0411; B60K 1/04; B60K 7/0007; B60Y 2200/13; Y02E 60/10; Y02T 10/70; B62M 7/12; B60L 58/26; B60L 2200/12; B60L 2200/24; B62J 43/16; B62J 45/41; B62K 3/002; B62K 11/10; B62K 27/12; H01M 10/6551
See application file for complete search history.

(56) References Cited

U.S. PATENT DOCUMENTS 10,857,046 B2 * 12/2020 Kim .................. A61G 5/047
10,888,474 B2 * 1/2021 Kim .................. A61G 5/047
(Continued)

FOREIGN PATENT DOCUMENTS

CN    205952205 U * 2/2017
DE    102016124710 A1 * 6/2017 .............. B60L 50/64
(Continued)

OTHER PUBLICATIONS

Translated copy of KR-20160140143-A (Year: 2023).*
Translated copy of DE-102018116094-A1 (Year: 2023).*

*Primary Examiner* — James A Shriver, II
*Assistant Examiner* — Ian Bryce Shelton
(74) *Attorney, Agent, or Firm* — Lempia Summerfield Katz LLC

(57) ABSTRACT

A towing module of a personal mobility includes: a main body provided to extend in a vertical direction and in which a battery is mounted: a driving wheel installed on a lower portion of the main body and having a driving motor: a steering handle installed on an upper portion of the main body; and a connector provided in the main body to selectively connect one of various types of modules to be towed. The main body is maintained in a standing state while driving by the connection to the module to be towed. A personal mobility and a control method thereof utilize the towing module.

16 Claims, 12 Drawing Sheets

(56) References Cited

U.S. PATENT DOCUMENTS

| | | | |
|---|---|---|---|
| 11,535,331 B2 * | 12/2022 | Lee | B62J 43/20 |
| 2018/0140486 A1 * | 5/2018 | Klein | A61G 5/128 |
| 2019/0061863 A1 * | 2/2019 | Lee | B62J 43/20 |
| 2019/0329660 A1 * | 10/2019 | Shieh | B60L 50/64 |
| 2019/0337587 A1 * | 11/2019 | den Hertog | B62J 43/28 |
| 2020/0000657 A1 * | 1/2020 | Kim | A61G 5/042 |
| 2020/0101804 A1 * | 4/2020 | Wei | B60D 1/145 |
| 2021/0188024 A1 * | 6/2021 | Richards | A01B 59/04 |
| 2021/0237523 A1 * | 8/2021 | Ceniza | B60D 1/02 |
| 2021/0265607 A1 * | 8/2021 | Bosscher | B62J 43/28 |
| 2021/0322234 A1 * | 10/2021 | Mauro | A61G 5/047 |
| 2022/0037730 A1 * | 2/2022 | Liu | H01M 50/264 |

FOREIGN PATENT DOCUMENTS

| | | | | |
|---|---|---|---|---|
| DE | 102017130681 B3 * | 2/2019 | | A61G 5/047 |
| DE | 102017130687 A1 * | 6/2019 | | A61G 5/027 |
| DE | 102018116094 A1 * | 1/2020 | | |
| EP | 3047986 A1 * | 7/2016 | | B60D 1/02 |
| KR | 101552963 B1 * | 9/2015 | | |
| KR | 20160000074 A * | 1/2016 | | |
| KR | 20160122456 A * | 10/2016 | | |
| KR | 20160140143 A * | 12/2016 | | |
| KR | 20180085128 A * | 7/2018 | | |
| KR | 20180097402 A * | 8/2018 | | |
| KR | 102037131 B1 | 11/2019 | | |
| KR | 20200061722 A * | 6/2020 | | |
| KR | 200492023 Y1 | 7/2020 | | |
| KR | 20200081867 A * | 7/2020 | | |
| KR | 20200089496 A * | 7/2020 | | |

* cited by examiner

TOWING MODULE, A PERSONAL MOBILITY INCLUDING THE SAME, AND A CONTROL METHOD FOR A PERSONAL MOBILITY

CROSS-REFERENCE TO RELATED APPLICATION(S)

This application is based on and claims priority under 35 U.S.C. § 119 to Korean Patent Application No. 10-2020-0125835, filed on Sep. 28, 2020, in the Korean Intellectual Property Office, the disclosure of which is incorporated by reference herein in its entirety.

BACKGROUND

1. Field

The disclosure relates to a towing module capable of being selectively connected to and used with various types of modules to be towed as needed and towing the modules to be towed, a personal mobility including the same, and a control method of a personal mobility.

2. Description of the Related Art

As used throughout this patent, the phrase "personal mobility" is intended to mean any moving personal vehicle, device, machine, instrument, apparatus, or the like. Recently, the use of a personal mobility such as an electric kickboard is expanding. The personal mobility may drive on roadways, sidewalks, narrow alleys, and the like by electric power.

There are various types of personal mobility, including electric wheels, electric kickboards, electric bicycles, and electric scooters. Therefore, a user may select the desired type of personal mobility according to a purpose, such as a short-distance transportation means, a transportation means, or a leisure means.

However, because the personal mobility has a different form depending on the purpose of use, one form of personal mobility may not be used for other purposes. For example, an electric kickboard used as a means of leisure or short distance transportation may not be used as a means of transport for cargo.

SUMMARY

It is an aspect of the disclosure to provide a towing module capable of being selectively connected to and towing various types of modules to be towed, i.e., pulled or driven. It is another aspect of the disclosure to provide a personal mobility including the same and a control method of a personal mobility.

It is another aspect of the disclosure to provide a towing module capable of improving the cooling efficiency of a battery during driving and easily managing the battery, a personal mobility including the same, and a control method of a personal mobility.

Additional aspects of the disclosure are set forth in part in the description which follows and, in part, should be apparent from the description, or may be learned by practice of the disclosure.

In accordance with an aspect of the disclosure, a towing module of a personal mobility includes: a main body provided to extend in a vertical direction and in which a battery is mounted; a driving wheel installed on a lower portion of the main body and having a driving motor; a steering handle installed on an upper portion of the main body; and a connector provided in the main body to selectively connect one of various types of modules to be towed. The main body is maintained in a standing state while driving by the connection to the module to be towed.

The battery may be installed in a direction in which a relatively large area thereof faces air encountered while driving.

The main body may include a battery receiver configured to receive the battery and having an open front surface, and a cover to open and close the front surface of the battery receiver.

The cover may include a battery pocket capable of receiving the battery in an open state.

The cover may be rotatably coupled to the main body.

The main body may include an elastic member configured to push and open the cover in which the battery is stored. The cover may open to the outside of the battery receiver when the cover is unlocked.

The cover may include a plurality of cooling fins made of a metal material on an outer surface thereof for heat exchange with air.

The connector may be provided on a rear surface of the main body and may connect the main body and the module to be towed to enable relative rotation.

The connector may include an upper connection member extending rearward from the rear surface of the main body to support an upper surface of a connection part of the module to be towed and having an upper pin coupling hole corresponding to a pin coupling hole of the connection part. The connector may further include a lower connection member extending rearward from the rear surface of the main body to support a lower surface of the connection part of the module to be towed and having a lower pin coupling hole disposed coaxially with the pin coupling hole of the connection part and the upper pin coupling hole. The connector may further include an electric coupling device having a coupling pin fastened to or separated from the upper pin coupling hole, the lower pin coupling hole, and the pin coupling hole of the connection part by advancing and retreating.

The electric coupling device may include a housing mounted on one of the upper connection member and the lower connection member to support the coupling pin to be movable in a fastening direction, a screw shaft screwed to the coupling pin to advance and retreat the coupling pin in the fastening direction by rotation, and a motor mounted on the housing to rotate the screw shaft.

The connector may further include a connection guide to guide the alignment of the pin coupling hole of the connection part and the upper and lower pin coupling holes.

The connector may further include one or more alignment sensors to detect whether the pin coupling hole of the connection part and the upper and lower pin coupling holes are aligned.

The towing module may further include an operation part to allow a user to command the operation of the electric coupling device, and a controller to control the operation of the electric coupling device based on information of the operation part and the one or more alignment sensors.

The towing module may further include an auxiliary connector provided at a position on the rear surface of the main body spaced downward from the connector for connection of the module to be towed.

In accordance with another aspect of the disclosure, a personal mobility including the towing module described above is provided.

In accordance with another aspect of the disclosure, a control method of a personal mobility Is provided. The personal mobility includes: a towing module; a module to be towed connected to the towing module; an electric coupling device to couple or separate a connector of the towing module and a connection part of the module to be towed; an operation part to command the operation of the electric coupling device; and one or more alignment sensors to detect whether the connector and the connection part are aligned to enable coupling. The control method includes determining whether the connector and the connection part are aligned through detection of the alignment sensors when a coupling signal is received from the operation part. The method also includes controlling the electric coupling device to couple the connector and the connection part when it is determined that the connector and the connection part are aligned to be connectable.

The control method may further include determining whether to drive when a separation signal is received from the operation part in a state in which the connector and the connection part are coupled. The method also includes warning of a danger of separation when driving and controlling the electric coupling device to release the coupling between the connector and the connection part when not driving.

The control method may further include controlling to warn of misalignment when it is determined that the connection is misaligned in the step of determining whether the connector and the connection part are aligned.

BRIEF DESCRIPTION OF THE DRAWINGS

These and/or other aspects of the disclosure should become apparent and more readily appreciated from the following description of the embodiments, taken in conjunction with the accompanying drawings in which.

DETAILED DESCRIPTION

Hereinafter, embodiments of the disclosure are described in detail with reference to the accompanying drawings. The embodiments described below are provided by way of example so that those having ordinary skill in the art will be able to fully understand the spirit of the disclosure. The disclosure is not limited to the embodiments described below and thus may be embodied in other forms. In order to clearly explain the disclosure, parts not related to the description are omitted from the drawings, and the width, length, thickness, etc. of the components may be exaggerated for convenience.

Figure 1A:
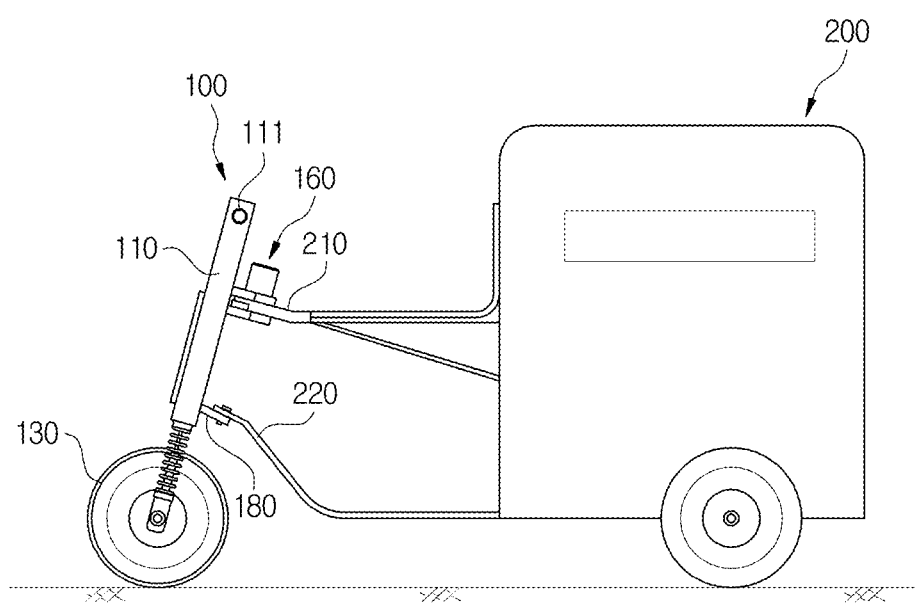
FIGS. 1A, 1B, and 1C illustrate various types of personal mobility to which a towing module according to an embodiment of the disclosure is applied.
Figure 1B:
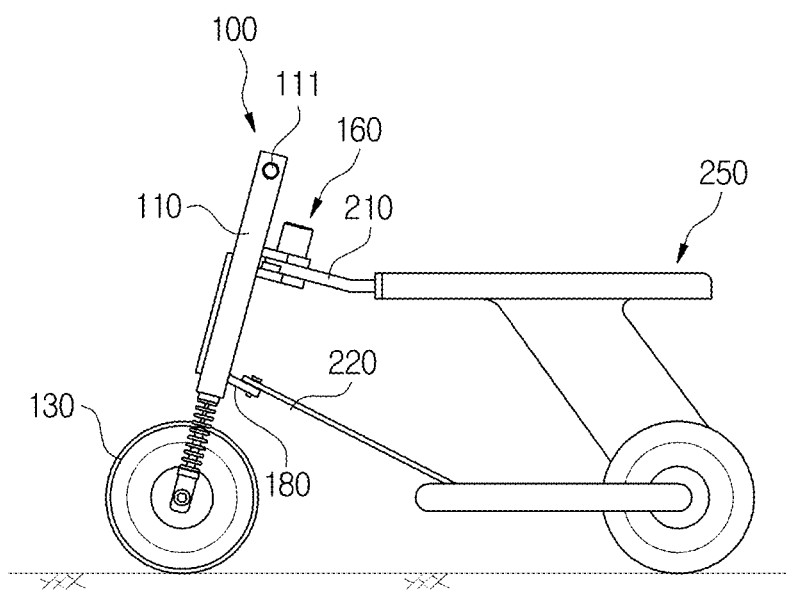
Figure 1C:
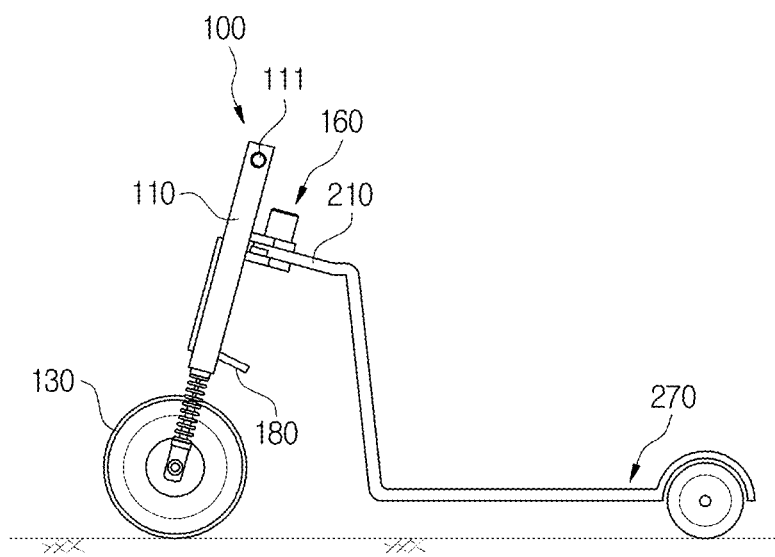

Referring to FIGS. 1A, 1B, and 1C, a personal mobility to which the disclosure is applied may include a towing module 100, and various types of modules to be towed 200, 250, and 270 capable of being selectively connected to the towing module 100. A user may implement various types of personal mobility by selectively connecting one of the modules to be towed 200, 250, and 270 to the shared towing module 100 as needed.

Figure 10:
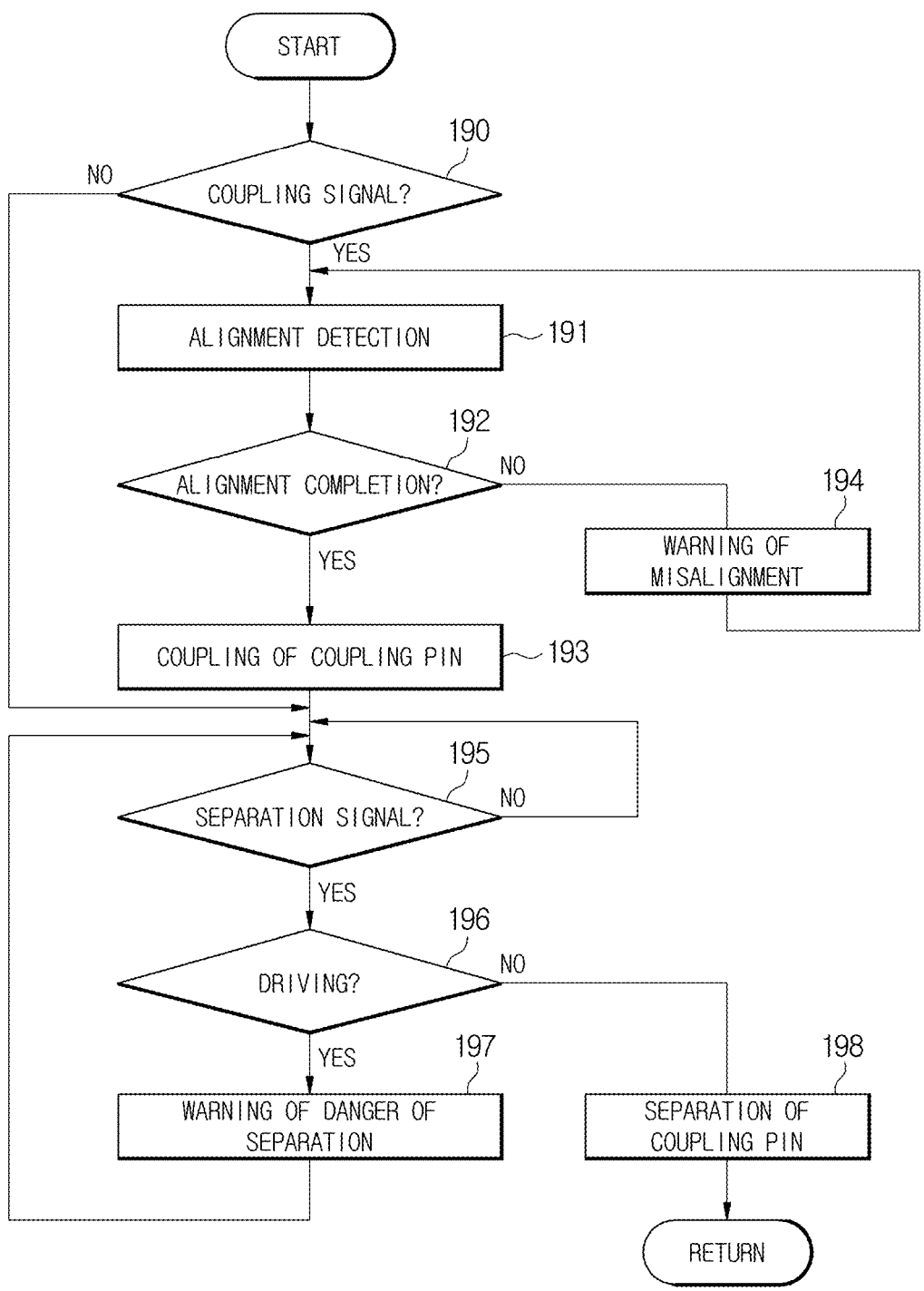
FIG. 10 is a flowchart illustrating a method of controlling a personal mobility according to an embodiment of the disclosure.

FIG. 1A illustrates a case where the module to be towed 200 is provided with a container or freight space and is connected to the towing module 100 so as to be used for freight transport. FIG. 1B illustrates a case where the module to be towed 250 is provided with a seat and is connected to the towing module 100 so as to be used like an electric bicycle or a scooter. FIG. 10 illustrates a case where the module to be towed 270 is provided with a footrest and is connected to the towing module 100 so as to be used like an electric kickboard. In addition, various other types of modules to be towed may be connected to the towing module 100.

Figure 2:
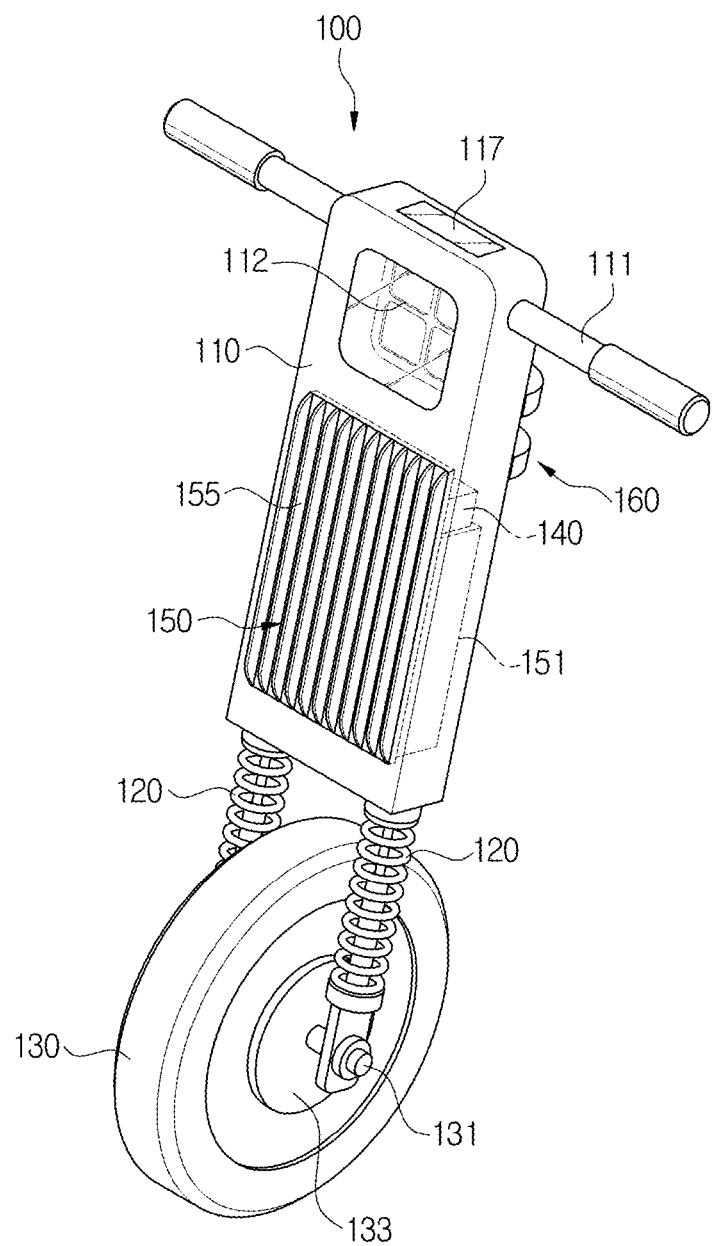
FIG. 2 is a perspective view of a personal mobility towing module according to an embodiment of the disclosure.
Figure 6:
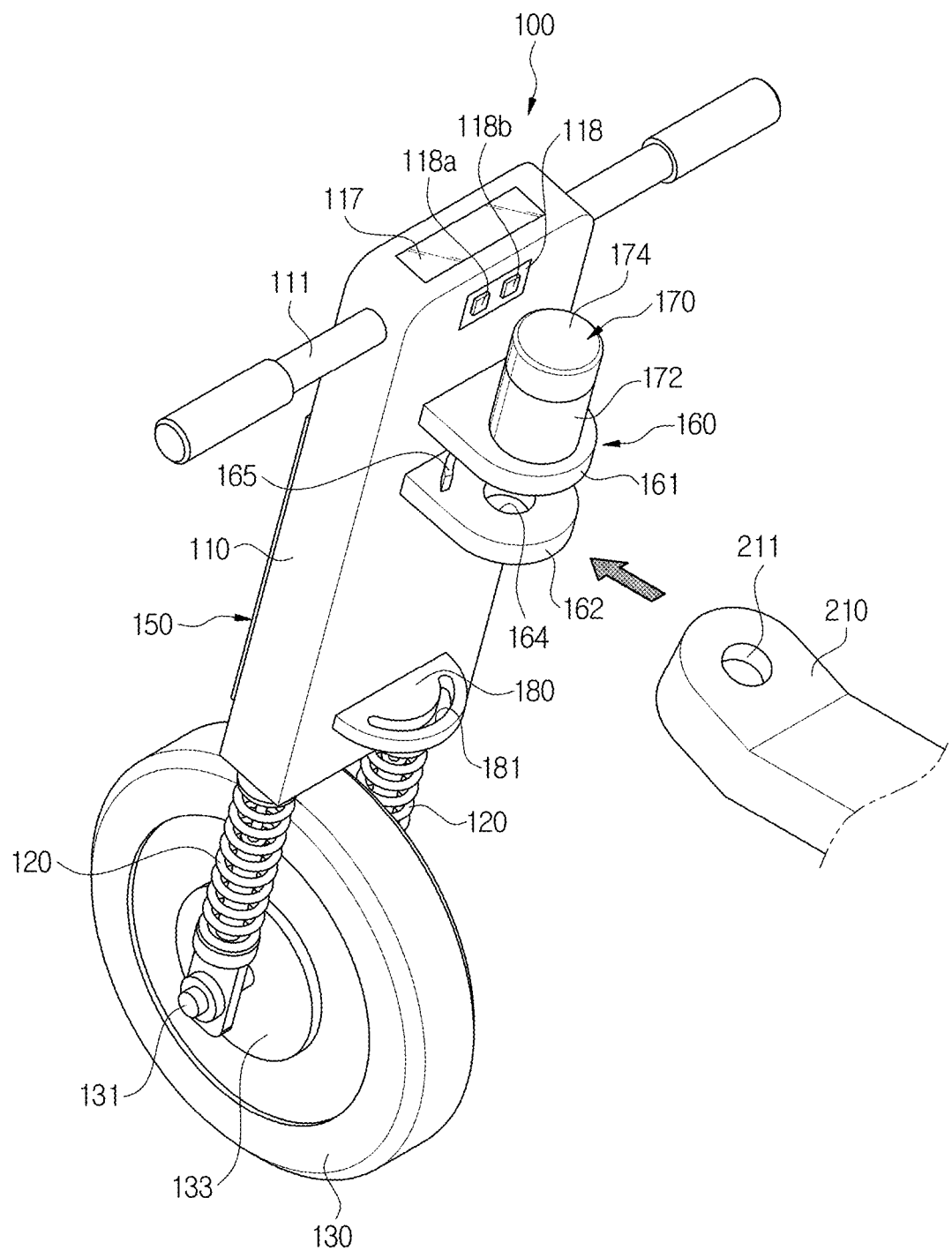
FIG. 6 is a perspective view of a connector of the personal mobility towing module according to an embodiment of the disclosure.

Referring to FIGS. 2 and 6, the towing module 100 may maintain a standing position when driving by connection of the modules to be towed 200, 250, and 270, and may tow the modules to be towed 200, 250, and 270 by including driving elements.

The towing module 100 may include a main body 110, a suspension, i.e., suspension elements or shock absorbers 120, a driving wheel 130, a driving motor 133, a braking device (not shown), a steering handle 111, a battery 140, a head lamp 112, and a connector 160 for connecting the modules to be towed 200, 250, and 270.

The main body 110 may be provided to extend in a vertical direction so as to enable standing driving in a state in which the modules to be towed 200, 250, and 270 are connected to a rear side thereof. The main body 110 may have a width larger than a thickness in front and rear directions in consideration of the installation of the battery 140.

The driving wheel 130 may be installed at a lower portion of the main body 110 via the suspension elements 120 on both sides. The suspension elements 120 may extend downward from both sides of the lower portion of the main body 110 to support a shaft 131 of the driving wheel 130, respectively. The driving motor 133 and the braking device may be installed at a central portion of the driving wheel 130. The driving wheel 130 may function as a front wheel in the personal mobility in which the towing module 100 and the modules to be towed 200, 250, and 270 are connected.

The steering handle 111 extends from an upper portion of the main body 110 to both sides to be gripped by both hands of a user, respectively. The user may control a driving direction of the driving wheel 130 installed at the lower portion of the main body 110 by rotating the main body 110 in the left and rear directions by manipulating the steering handle 111.

The head lamp 112 may be installed on a front upper side of the main body 110. The battery 140 may be mounted into the main body 110 in a form that may occupy most of the area of the main body 110 located below the head lamp 112. The battery 140 may be embedded in the main body 110 so as not to be exposed to the outside or exterior or may be attached to an outer surface of the main body 110 by employing a separate mounting means.

Figure 3:
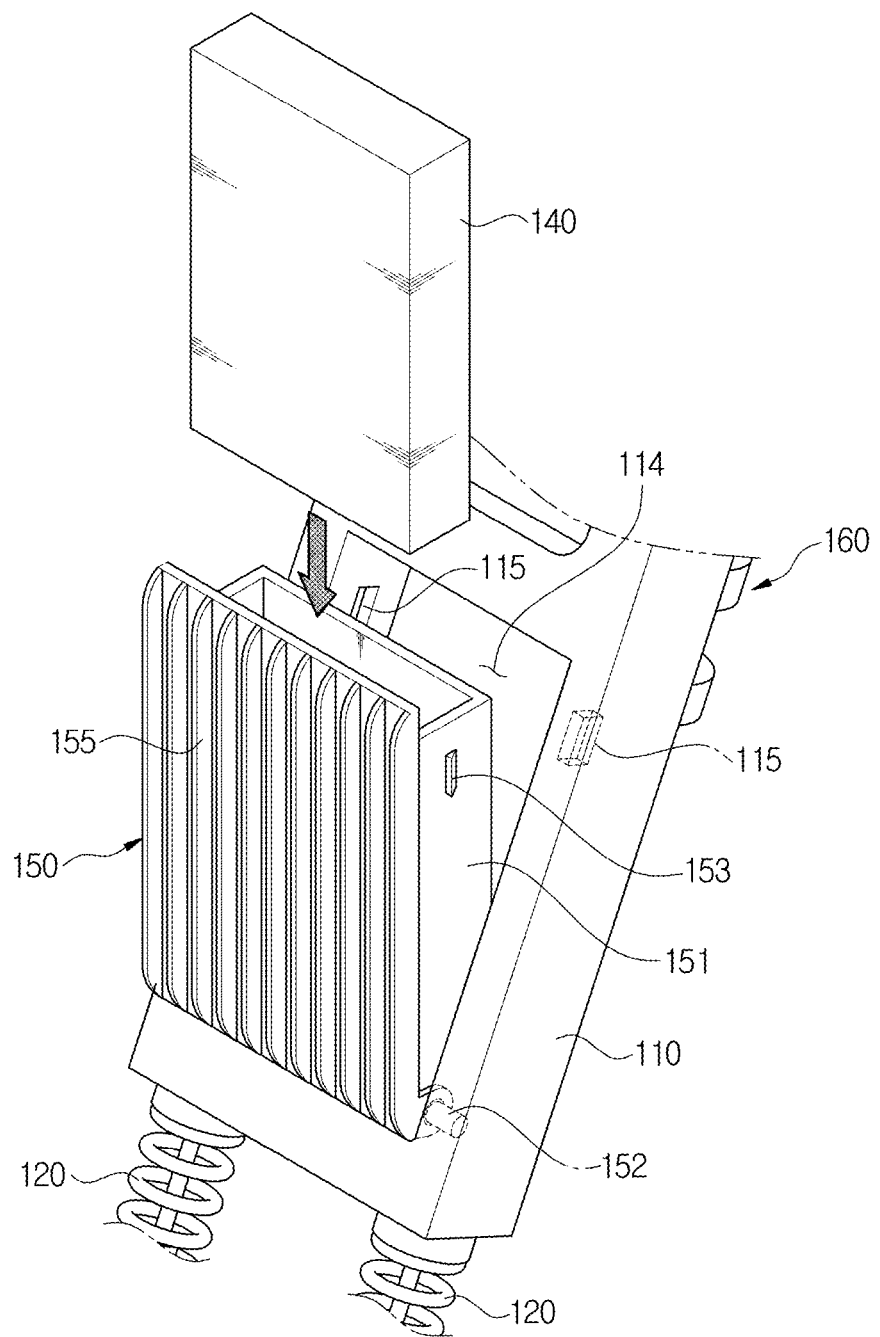
FIG. 3 is a perspective view of a battery receiver and a cover of the personal mobility towing module according to an embodiment of the disclosure.
Figure 4:
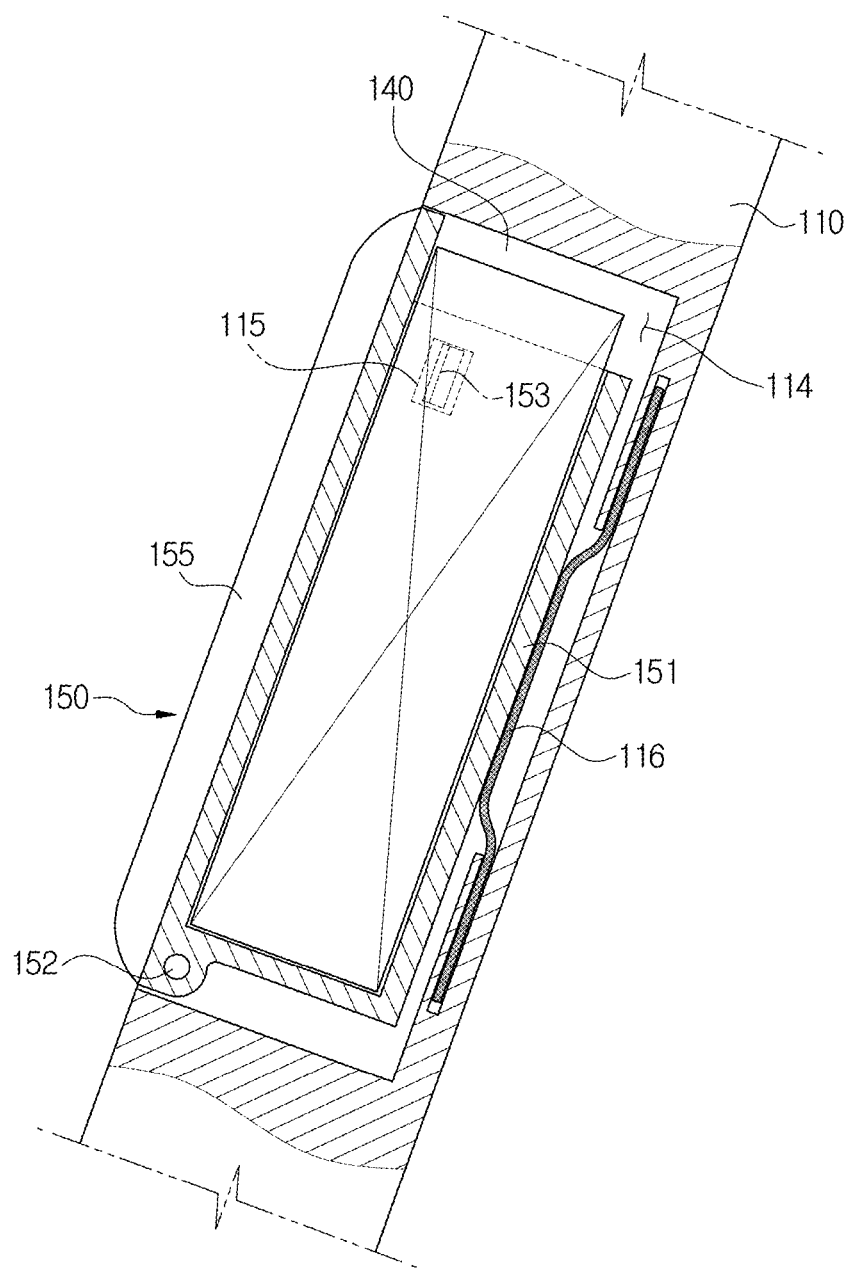
FIG. 4 is a cross-sectional view of the battery receiver of the personal mobility towing module according to an embodiment of the disclosure.
Figure 5:
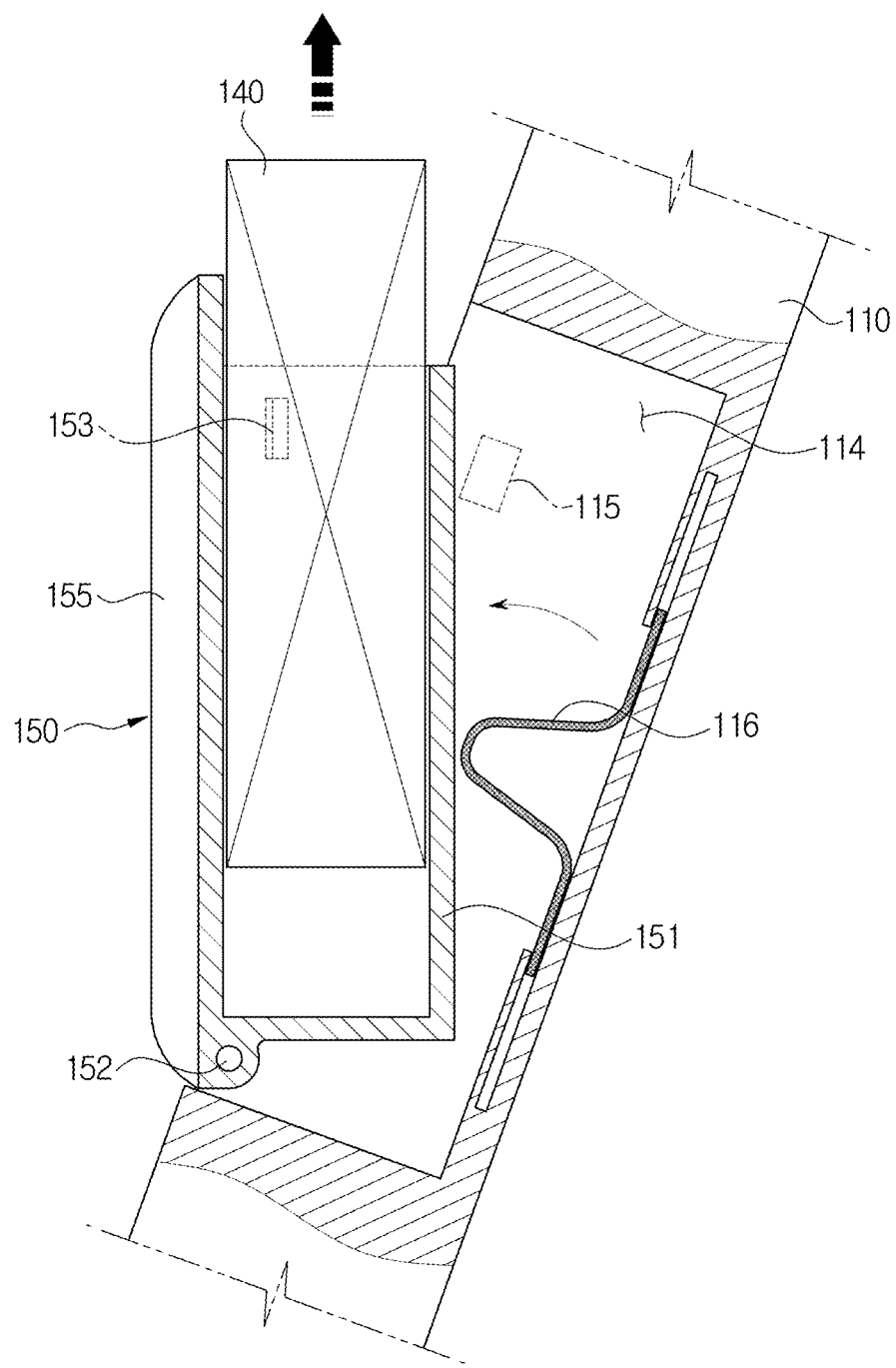
FIG. 5 is a cross-sectional view of the battery receiver of the personal mobility towing module in a state in which the cover is open according to an embodiment of the disclosure.

FIGS. 3-5 illustrate a method of mounting the battery 140 inside the main body 110. Referring to FIGS. 3-5, the main body 110 may include a battery receiver 114 receiving the battery 140 therein and having an open front surface. The main body 110 may also have a cover 150 to open and close the front surface of the battery receiver 114.

The battery 140 may be received in the battery receiver 114 such that a relatively large area thereof directs to a front surface of the main body 110 facing air encountered while driving in consideration of cooling the battery.

As illustrated in FIGS. 3 and 5, the cover 150 may include a battery pocket 151 capable of storing the battery 140 in a sliding manner on a rear surface thereof in a state in which the battery receiver 114 is opened. Both sides of a lower portion of the cover 150 may be rotatably connected to the main body 110 by hinge devices 152. Accordingly, the cover 150 may be opened in a manner in which an upper portion thereof is rotated and lifted.

The battery receiver 114 may further include at least one locking device 115 for fixing the cover 150 when the cover 150 is closed on both sides of an upper portion of the battery receiver 114. The locking device 115 may be an electric type or a manual type. When the cover 150 is closed, the locking device 115 may hook and restrain locking protrusions 153 provided on both sides of the battery pocket 151 of the cover 150, respectively.

As illustrated in FIG. 5, an elastic member 116 may be installed in the battery receiver 114 of the main body 110 to push and open the cover 150 in which the battery 140 is stored when locking of the cover 150 is released. The elastic member 116 may be a leaf spring in which both ends thereof are slidably supported on an inner surface of the battery receiver 114 and a middle portion thereof is bent in an angular shape.

In the towing module 100 described above, the cover 150 of the battery receiver 114 in which the battery 140 is stored is opened by rotation toward the front of the main body 110 when the locking device 115 is unlocked. Thus, the user may easily remove or mount the battery 140.

Referring to FIGS. 2 and 3, the cover 150 may be made of a metal material having excellent heat transfer performance to improve cooling efficiency of the battery 140. A plurality of cooling fins 155 is provided on a front surface of the cover 150 to increase a heat exchange area in contact with outside air.

Because the plurality of cooling fins 155 is exposed to the outside, the cover 150 may be smoothly cooled through heat exchange with outside air when the towing module 100 is driven or moving. Accordingly, the battery 140 is installed inside the cover 150 so as to be in contact with the cover 150 and also smoothly cooled, thereby improving efficiency.

Figure 7:
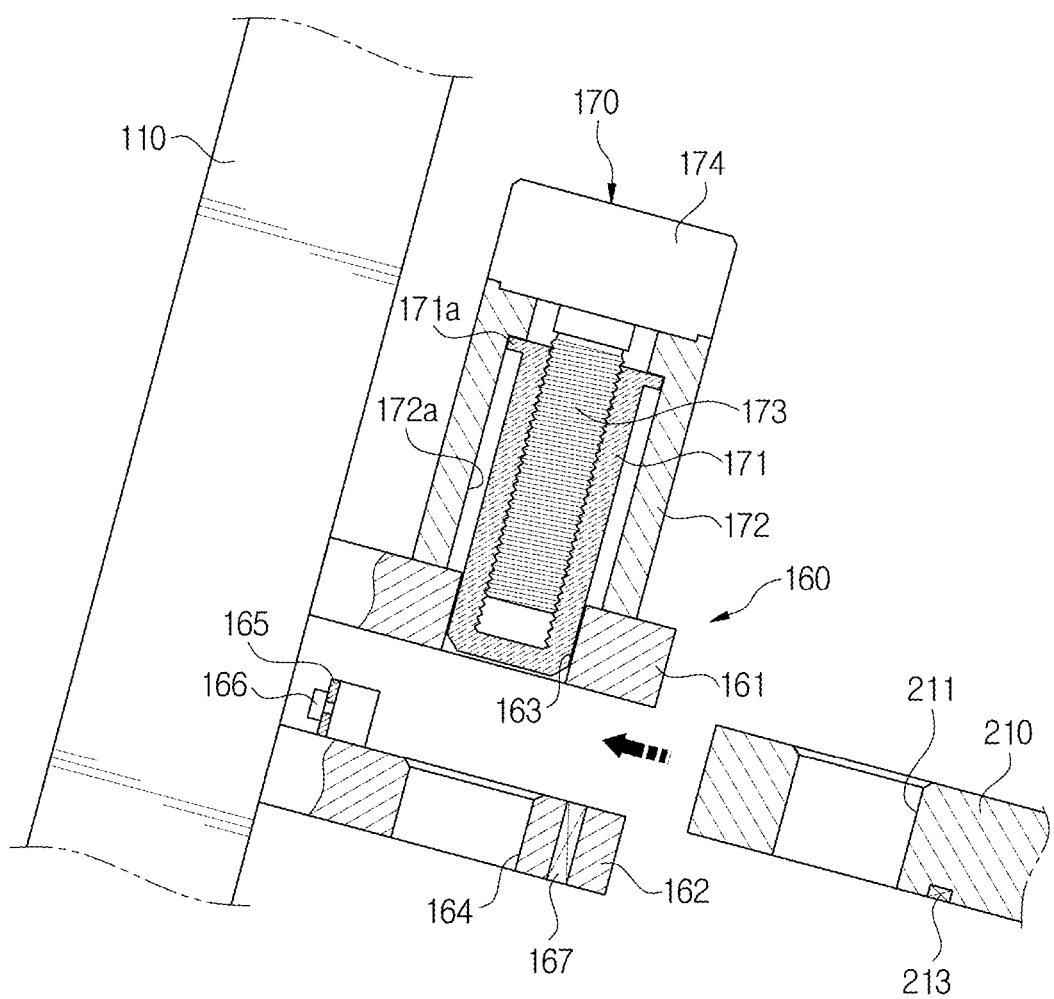
FIG. 7 is a cross-sectional view of the connector of the personal mobility towing module in a state in which a module to be towed is separated according to an embodiment of the disclosure.
Figure 8:
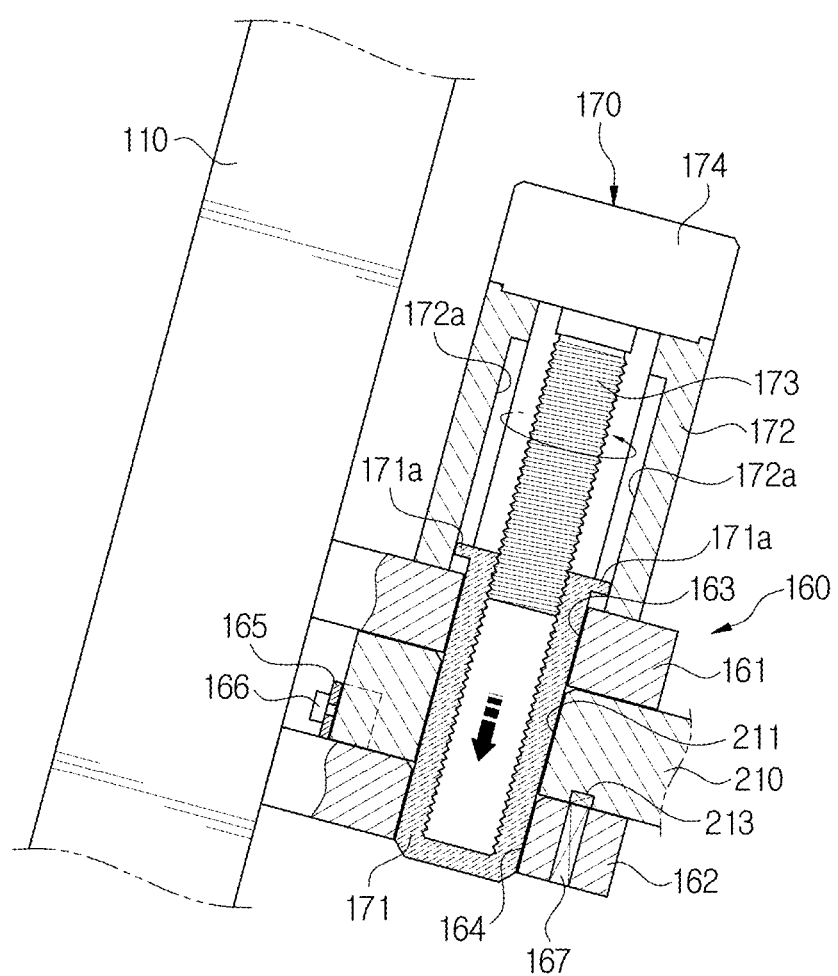
FIG. 8 is a cross-sectional view of the connector of the personal mobility towing module in a state in which the module to be towed is connected according to an embodiment of the disclosure.

As illustrated in FIGS. 6-8, the connector 160 is provided on an upper side of a rear surface of the main body 110 and may connect the main body 110 and the modules to be towed 200, 250, and 270 in a manner enabling relative rotation. The connector 160 may include an upper connection member 161, a lower connection member 162, an electric coupling device 170, a connection guide 165, a first alignment sensor 166, and a second alignment sensor 167.

The upper connection member 161 is fixed to the rear surface of the main body 110. The upper connection member 161 extends rearward from the rear surface of the main body 110 to support an upper surface of a connection part 210 of the modules to be towed 200, 250, and 270. The upper connection member 161 includes an upper pin coupling hole 163 penetrating in the vertical direction to correspond to a pin coupling hole 211 formed on the connection part 210 of the modules to be towed 200, 250, and 270.

The lower connection member 162 is fixed to the rear surface of the main body 110 to be spaced downward from the upper connection member 161. The lower connection member 162 extends rearward from the rear surface of the main body 110 to support a lower surface of the connection part 210. A distance between the upper connection member 161 and the lower connection member 162 corresponds to a thickness of the connection part 210. The lower connection member 162 also includes a lower pin coupling hole 164 disposed coaxially with the pin coupling hole 211 of the connection part 210 and the upper pin coupling hole 163.

As illustrated in FIGS. 7 and 8, the electric coupling device 170 includes a coupling pin 171 to advance and retreat in the vertical direction, a housing 172 to support the coupling pin 171, a screw shaft 173 screwed to the coupling pin 171, and a motor 174 to rotate the screw shaft 173.

Referring to FIG. 7, the housing 172 is installed above the upper connection member 161 and supports the coupling pin 171 so as to advance and retreat the coupling pin 171 in the vertical direction. The coupling pin 171 is maintained in a state in which a part of the coupling pin 171 enters the upper pin coupling hole 163. As illustrated in FIG. 8, the coupling pin 171 moves downward and enters the upper pin coupling hole 163, the pin coupling hole 211 of the connection part 210, and the lower pin coupling hole 164, thereby rotatably connecting the upper connection member 161, the lower connection member 162, and the connection part 210.

The screw shaft 173 is screwed to the coupling pin 171 in the state of entering into the coupling pin 171 and advances and retreats the coupling pin 171 in the vertical direction by rotation. The motor 174 is fixed to an upper side of the housing 172 and rotates the screw shaft 173 in the forward or reverse direction for the operation of the coupling pin 171.

One or more protrusions 171a to suppress rotation may be provided on an upper outer surface of the coupling pin 171. One or more guide grooves 172a may be provided on an inner surface of the housing 172 and extending in the advancing and retreating directions of the coupling pin 171 to guide the one or more protrusions 171a, Therefore, when the screw shaft 173 rotates, the coupling pin 171 may move in a fastening direction or a separation direction in a state in which rotation is restricted.

In the present embodiment, the electric coupling device 170 is installed on the upper connection member 161, but the electric coupling device 170 may be installed on the lower connection member 162. In this embodiment, the housing 172 may be coupled to a lower side of the lower connection member 162, and the coupling pin 171 may rise from the lower side to couple the connection part 210.

In the present embodiment, the electric coupling device 170 includes the screw shaft 173 and the motor 174. However, the electric coupling device 170 is not limited thereto, and various other forms may be employed. For example, the electric coupling device 170 may have a type including a solenoid coil that advances and retreats the coupling pin 171 in the coupling direction.

As illustrated in FIG. 6, a front end of the connection part 210 of the modules to be towed 200, 250, and 270 may be provided in a semicircular shape in consideration of steering of the towing module 100.

The connection guide 165 may have a curved shape corresponding to the front end of the connection part 210 and may be provided on an upper surface of the lower connection member 162. The connection guide 165 may limit an entry depth of the connection part 210. In addition, because the connection guide 165 has a curved shape, the connection guide 165 may guide the alignment of the pin coupling hole 211 of the connection part 210 and the lower and upper pin coupling holes 163 and 164.

The first alignment sensor 166 is installed on the connection guide 165. The first alignment sensor 166 may detect whether the connection part 210 has entered for connection and whether the pin coupling hole 211 coincides with the position of the coupling pin 171. The first alignment sensor 166 may be composed of a pressure sensor, a Hall sensor, a reed switch, a capacitive proximity switch, or the like.

The second alignment sensor 167 may be installed on the lower connection member 162 opposite the first alignment sensor 166 based on the center of the lower pin coupling hole 164, The first alignment sensor 166 and the second alignment sensor 167 may be disposed to be located on a straight line passing through the center of the lower pin coupling hole 164. The second alignment sensor 167 may be a Hall sensor, and the magnet 213 may be installed at a position on the connection part 210 corresponding to the second alignment sensor 167.

The first alignment sensor 166 and the second alignment sensor 167 may detect whether the position of the pin coupling hole 211 of the connection part 210 coincides with the position of the coupling pin 171 when the connection part 210 enters between the upper connection member 161 and the lower connection member 162.

Referring to FIG. 6, a display part 117 may be provided on the main body 110 to display an operating state, whether the modules to be towed 200, 250, and 270 are connected or not, and the like. An operation part 118 may also be provided on the main body 110 to allow the user to command the operation of the electric coupling device 170. The operation part 118 may include the coupling switch 118a for commanding coupling of the coupling pin 171 and a separation switch 118b for commanding separation of the coupling pin 171. A controller (not shown) to control the operation of the electric coupling device 170 based on information of the operation part 118 and the first and second alignment sensors 166 and 167 may be provided in the main body 110 of the towing module 100.

Figure 9:
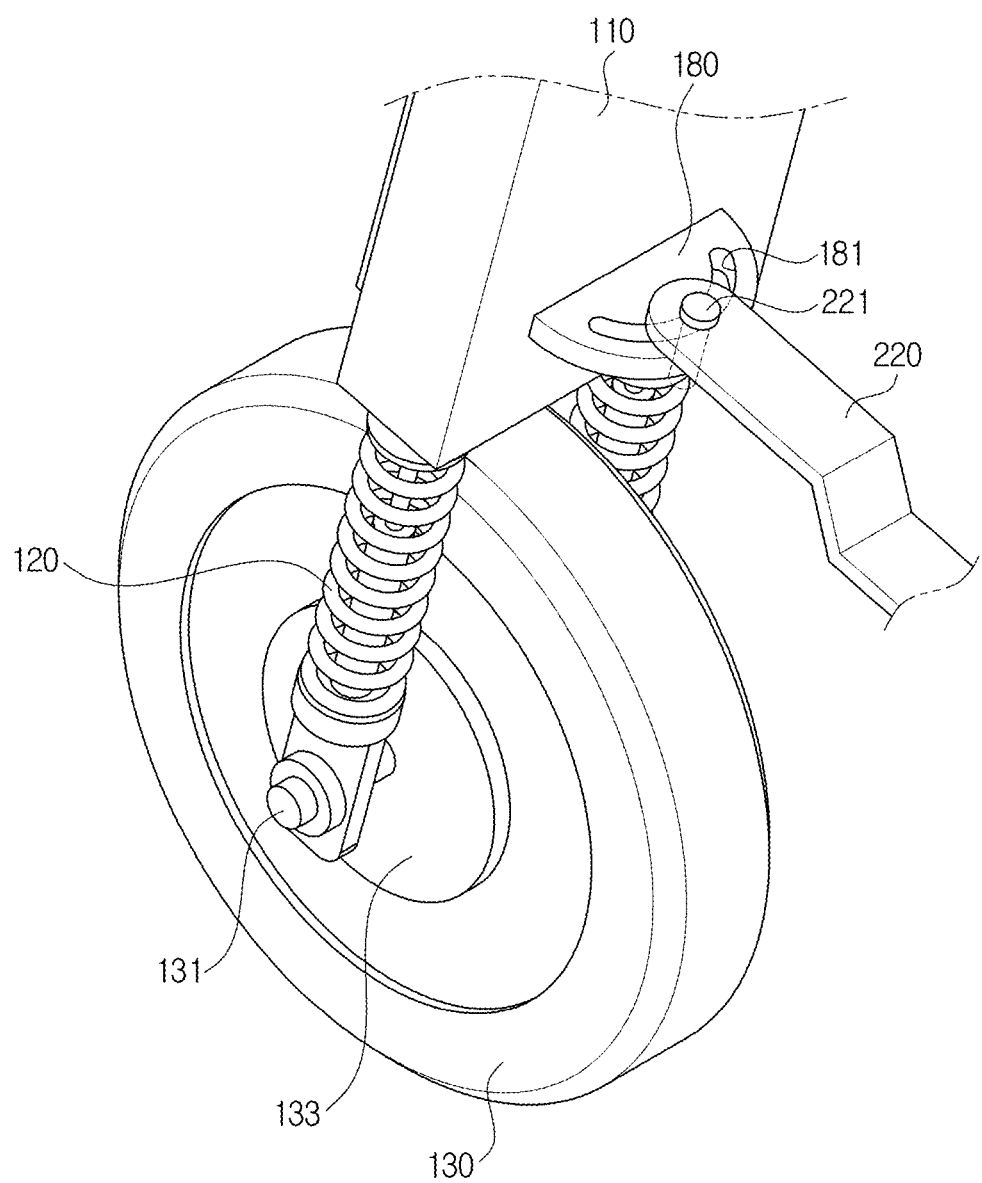
FIG. 9 is a perspective view of an auxiliary connector of the personal mobility towing module according to an embodiment of the disclosure.

Referring to FIGS. 6 and 9, an auxiliary connector 180 may be provided at a position on the rear surface of the main body 110 of the towing module 100 spaced apart downward from the connector 160. The auxiliary connector 180 is fixed to the rear surface of the main body 110 and may be a semicircular plate extending rearward from the rear surface of the main body 110. When the auxiliary connector 180 includes a lower connection part 220 like the module to be towed 200 for freight transport in FIG. 1A or the electric bicycle in FIG. 1B, the auxiliary connector 180 may be used to connect the lower connection part 220 to the towing module 100.

The auxiliary connector 180 includes a semicircular pin coupling groove 181 having a center of curvature coincident with the center of the coupling pin 171 of the electric coupling device 170, The lower connection part 220 may be connected to the auxiliary connector 180 by coupling the lower coupling pin 221 to the semicircular pin coupling groove 181. The semicircular pin coupling groove 181 enables smooth steering of the towing module 100 because the center of curvature thereof coincides with the center of the coupling pin 171 thereon.

Hereinafter, a method of controlling the operation of the electric coupling device 170 when the connection part 210 of the modules to be towed 200, 250, and 270 are connected to the connector 160 of the towing module 100 is described with reference to FIGS. 6-8 and 10.

The user may command the coupling of the electric coupling device 170 through the operation part 118 in a state in which the connection part 210 of the modules to be towed 200, 250, and 270 enters into the connector 160 of the towing module 100.

In this case, as illustrated in FIG. 10, the controller: determines whether a coupling signal is received from the operation part 118 (190); detects the alignment of the connector 160 and the connection part 210 through the first alignment sensor 166 and the second alignment sensor 167 when the coupling signal is received (191); and determines whether the connector 160 and the connection part 210 are aligned based on the detection information of the first and second alignment sensors 166 and 167 (192).

When it is determined that the connector 160 and the connection part 210 are misaligned in step 192, the controller warns the user of the misalignment (194). In this case, the misalignment may be displayed on the display part 117 or an audio signal may be generated.

When it is determined that the connector 160 and the connection part 210 are aligned to be connectable in step 192 of determining whether to be aligned, the controller operates the electric coupling device 170 such that the coupling pin 171 couples the connector 160 and the connection part 210. In this case, as illustrated in FIG. 8, the coupling pin 171 hooks the pin coupling hole 211 of the connection part 210 to couple the connection part 210.

When the modules to be towed 200, 250, and 270 are to be separated from the towing module 100 for replacement of the modules to be towed 200, 250, and 270, the user may command through the operation part 118 to release the coupling of the electric coupling device 170.

In this case, the controller determines whether a separation signal is received from the operation part 118 in a state in which the connector 160 and the connection part 210 are coupled (195) and determines whether the towing module 100 is being driven when the separation signal is received (196).

When it is determined that the towing module 100 is driving in step 196 of the controller warns of the danger of separation through the display part 117 and does not command the coupling release operation of the electric coupling device 170. Therefore, even when the operation part 118 is operated while driving, a risk in which the modules to be towed 200, 250, and 270 are separated from the towing module 100 may be prevented.

When it is determined that the towing module 100 is not being driven (stop state) in step 196, the controller operates the electric coupling device 170 such that the coupling pin 171 releases the coupling between the connector 160 and the connection part 210. In this case, as illustrated in FIG. 7, the coupling pin 171 rises such that the connection part 210 may be separated.

As such, because the modules to be towed 200, 250, and 270 may be automatically coupled to or separated from the towing module 100 of the present embodiment by the operation of the electric coupling device 170, one of the various types of the modules to be towed 200, 250, and 270 may be selected as needed and may be easily connected to or disconnected from the towing module 100.

In addition, because the towing module 100 of the present embodiment includes elements for driving, such as the drive motor 133, the brake device, and the battery 140, the towing module 100 may tow the modules to be towed 200, 250, and 270. Therefore, because when the towing module 100 is used, the modules to be towed 200, 250, and 270 do not need to have elements for driving, various types of the modules to be towed 200, 250, and 270 may be manufactured at low cost.

As is apparent from the above, because a towing module of a personal mobility according to the disclosure includes elements for driving such as a drive motor, a brake device, and a battery, the towing module can tow modules to be towed. Therefore, because when the towing module is used, the modules to be towed do not need to have elements for driving, various types of modules to be towed can be manufactured at low cost, and various types of personal mobility can be implemented by selectively connecting various types of modules to be towed.

Further, because modules to be towed can be automatically coupled to or separated from the towing module of a personal mobility according to the disclosure by the operation of an electric coupling device, one of the various types of modules to be towed can be selected as needed and can be easily connected to or disconnected from the towing module.

Further, in the towing module of a personal mobility according to the disclosure, because a cover covering a battery is positioned on a front surface of a main body so that the cover faces air encountering while driving to be easily cooled by the air, the cooling efficiency of the battery can be improved. In addition, because the battery can be separated by opening the cover on the front surface of the main body, the battery can be easily managed.

What is claimed is:

1. A towing module for a personal mobility, the towing module comprising:
   a main body provided to extend in a vertical direction and in which a battery is mounted;
   a driving wheel installed on a lower portion of the main body and having a driving motor;
   a steering handle installed on an upper portion of the main body;
   a connector provided on the main body to selectively connect one of various types of modules to be towed; and
   an auxiliary connector provided at a position on a rear surface of the main body spaced from the connector for connection of the module to be towed,
   wherein the main body is maintained in a standing state while driving by the connection to the module to be towed, and
   wherein the connector is provided on the rear surface of the main body and connects the main body and the module to be towed to enable relative rotation.

2. The towing module according to claim 1, wherein the battery includes a first surface and a second surface having an area larger than that of the first surface, and the battery is installed in a direction in which the second surface faces in a direction to encounter air while driving.

3. The towing module according to claim 1, wherein the main body comprises a battery receiver configured to receive the battery and having an open front surface, and a cover to open and close the front surface of the battery receiver.

4. The towing module according to claim 3, wherein the cover comprises a battery pocket capable of receiving the battery in an open state.

5. The towing module according to claim 4, wherein the cover is rotatably coupled to the main body.

6. The towing module according to claim 5, wherein the main body comprises an elastic member configured to push and open the cover in which the battery is stored to the outside of the battery receiver when the cover is unlocked.

7. The towing module according to claim 4, wherein the cover comprises a plurality of cooling fins made of a metal material on an outer surface thereof for heat exchange with air.

8. The towing module according to claim 1, wherein the connector comprises:
   an upper connection member extending rearward from the rear surface of the main body to support an upper surface of a connection part of the module to be towed and having an upper pin coupling hole corresponding to a pin coupling hole of the connection part;
   a lower connection member extending rearward from the rear surface of the main body to support a lower surface of the connection part of the module to be towed and having a lower pin coupling hole disposed coaxially with the pin coupling hole of the connection part and the upper pin coupling hole; and
   an electric coupling device having a coupling pin fastened to or separated from the upper pin coupling hole, the lower pin coupling hole, and the pin coupling hole of the connection part by advancing and retreating.

9. The towing module according to claim 8, wherein the electric coupling device comprises:
   a housing mounted on one of the upper connection member and the lower connection member to support the coupling pin to be movable in a fastening direction;
   a screw shaft screwed to the coupling pin to advance and retreat the coupling pin in the fastening direction by rotation; and
   a motor mounted on the housing to rotate the screw shaft.

10. The towing module according to claim 8, wherein the connector further comprises a connection guide to guide the alignment of the pin coupling hole of the connection part and the upper and lower pin coupling holes.

11. The towing module according to claim 8, wherein the connector further comprises one or more alignment sensors to detect whether the pin coupling hole of the connection part and the upper and lower pin coupling holes are aligned.

12. The towing module according to claim 11, further comprising:
   an operation part to allow a user to command the operation of the electric coupling device; and
   a controller to control the operation of the electric coupling device based on information of the operation part and the one or more alignment sensors.

13. A personal mobility comprising the towing module of claim 1.

14. A control method of a personal mobility having a towing module, a module to be towed connected to the towing module, an electric coupling device to couple or separate a connector of the towing module and a connection part of the module to be towed, an operation part to command the operation of the electric coupling device, and one or more alignment sensors to detect whether the connector and the connection part are aligned to enable coupling, the control method comprising:

determining whether the connector and the connection part are aligned through detection of the alignment sensors when a coupling signal is received from the operation part;

controlling the electric coupling device to couple the connector and the connection part when it is determined that the connector and the connection part are aligned to be connectable;

determining whether to drive when a separation signal is received from the operation part in a state in which the connector and the connection part are coupled; and warning of a danger of separation when driving and controlling the electric coupling device to release the coupling between the connector and the connection part when not driving.

15. The control method according to claim 14, further comprising controlling to warn of misalignment when it is determined that the connector and the connection part are misaligned in the step of determining whether the connector and the connection part are aligned.

16. The towing module according to claim 1, wherein the auxiliary connector is spaced downward from the connector on the rear surface of the main body.

* * * * *